INVENTOR
Paul S. Roller

INVENTOR
Paul S. Roller
BY
ATTORNEY

United States Patent Office 3,415,726
Patented Dec. 10, 1968

3,415,726
ELECTROLYTIC PRODUCTION OF
METAL HYDROXIDE
Paul S. Roller, 1341 G St. NW.,
Washington, D.C. 20005
Filed Mar. 29, 1965, Ser. No. 443,284
7 Claims. (Cl. 204—96)

The invention pertains to the production electrolytically of metal hydroxide from metal electrodes, and in particular to the enhancement of electrode efficiency.

The metals ordinarily employed as electrodes in the electrolytic production of metal hydroxide in a liquid in which it is insoluble are aluminum or iron. Other metals that may be employed as electrodes are, for example, magnesium, copper, nickel, zinc and silver, each giving rise to the respective insoluble hydroxide, for such use as subsequently it may have. Aluminum and iron are of particular interest, however, because their trivalent hydroxides are coagulating and flocculating agents of suspended matter in water.

The metal hydroxide-producing electrolytic process has been unfeasible in the past because of the recognized formation of an indurated layer on the electrodes. For its removal, the art had practiced scraping or abrading. In my U.S. Patent 3,006,826, it was disclosed that the indurated layer is preceded by a soft film on the electrode, and that the precedent removal of this film by wiping precludes formation of the hard layer. Accordingly, good electrolytic operation has been obtained by wiping the electrodes during the electrolytic production of metal hydroxide. In accordance with normal, accepted practice, the wiping has been continual during the course of the electrolytic action.

However, after prolonged operation employing said continual wiping, more particularly in the instance of aluminum, a loss in electrode efficiency has been apt to occur, as evidenced by a decreasing electrolytic current at constant voltage. The decreasing current has eventuated whether wiping of the electrodes was continually rotary or continually reciprocating.

I have now discovered that it is the continuity in wiping which is an important factor in the loss of electrode efficiency, and that continuity is to be avoided consistent with maintenance of a film that is wipable.

It is accordingly an object of the invention to provide for increased electrolytic efficiency by wiping the electrodes for brief intervals following extended periods of electrolytic operation without wiping, said periods being shorter than that in which an accumulating soft film on the electrodes will have become indurated or otherwise adversely altered.

Another object is to provide for improved electrolytic efficiency by discontinual wiping of the electrodes in combination with reversal of the electrolytic current.

A further object is to provide for improved electrolytic efficiency by wiping the electrodes for brief intervals while discontinuing the electrolytic current and conditioning the electrodes.

A still further object is to provide for reduced wear of the wipers by applying wiping of the electrodes for brief intervals in the course of electrolytic operation.

With these and other objects in mind, as will become more apparent hereinafter, for a better understanding of the invention reference is made to the drawing, in which like parts are identified by like numerals, and in which.

Figure 1:
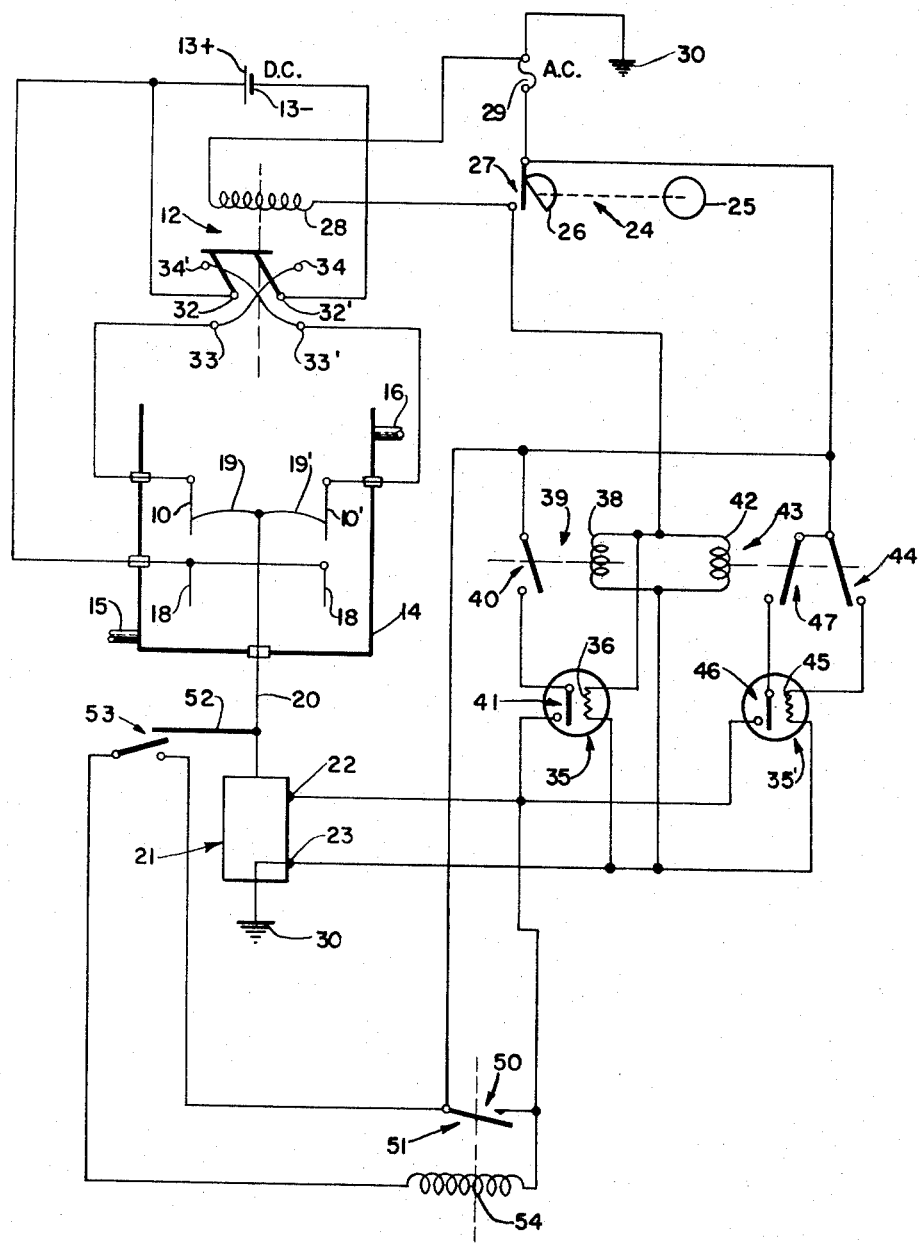
FIG. 1 is a schematic diagram of an electrolytic metal hydroxide-producing apparatus, illustrating an arrangement for wiping the electrodes for a brief interval during the course of electrolytic operation.

Referring now to the drawing, the apparatus comprises an assembly of electrodes 10 and 10' installed in a container 14, wiper means 19 and 19' for said electrodes, a foreign anode 18 which may be included in a circuit to said electrodes, an electrolytic current supply 13+ and 13—, a reversing relay 12 intermediate said electrodes and said current supply, periodic timer means 24 controlling said reversing relay, and time delay and relay means 35 and 35' to restrict the wiping of said electrodes to brief intervals in the course of the electrolytic current passage.

The relays in the drawing are shown by convention in their normal, unactuated state. When a relay is actuated, as a result of energizing of its coil, each armature of said relay is pulled in the direction of said coil, and in this travel makes or breaks on a relay contact.

Metallic electrodes 10 and 10', preferably in the form of rectangular plates, are representative of a plurality of similar electrodes, connected in parallel or in series, or in parallel-series combination. Container 14, insulatingly supporting electrodes 10 and 10', is provided with inlet conduit 15 supplying water or aqueous solution, and outlet conduit 16 for continuous flow of liquid through said container.

Foreign anode 18, similarly to that described in my pending U.S. patent application Ser. No. 177,082, now Patent No. 3,256,162, of suitable stainless steel or other alloy or of carbon, may be insulatingly situated in container 14 proximal to electrodes 10 and 10', and in general comprises a plurality of electrically interconnected, similar electrodes corresponding in number to the number of similar electrodes 10 and 10'. Foreign anode 18 is in circuit to a source of positive power, either directly or through relay switch means as hereinafter described, said power source being conveniently terminal 13+.

Wipers 19 and 19', comprising rubber or rubber-like elements and supports therefor, are situated between and in contact with electrodes 10 and 10' respectively. Rod 20, passing through container 14, is connected at one end to said wipers 19 and 19', and at the other end to wiper drive 21. Said drive is preferably reciprocating, and comprises any suitable operating means, such as an air cylinder with associated solenoid valves, an electrically powered solenoid, or a motor with crankshaft connection. In all cases, wiper drive 21 is actuated by A.C. current issuing from power supply 29 to ground 30, applied to its terminals 22 and 23.

Wipers 19 and 19' in their reciprocating motion pass preferably beyond the confronting edges of electrodes 10 and 10' to adjacent coplanar, secondary surfaces. These surfaces may comprise foreign anode 18, as disclosed in my copending U.S. patent application Ser. No. 294,677, now Patent No. 3,294,665.

Periodic timer 24 comprises clock motor 25, cam 26 that is shaft-connected to it, and cam-controlled timer switch 27 which is in circuit with coil 28 of reversing relay 12. Being cut 180 degrees, said cam 26 causes timer switch 27 to make and break symmetrically, and correspondingly to energize or deenergize coil 28 of reversing relay 12. Electrolytic current, entering said reversing relay 12 at terminals 32 and 32', issues from contacts 34 and 34' to electrodes 10 and 10' in one direction, or from contacts 33' and 33 to said electrodes in the opposite direction, whereby the electrolytic current is reversing cyclically in equal time periods.

It is evident that the make or break of timer switch 27 may be keyed to the direction of the electrolytic current, and hence to the polarity, whether anode or cathode, of either electrode 10 or 10'.

Time delay means may comprise any suitable form, and are herein shown illustratively as thermal time delay relays 35 and 35', each comprising a thermal element and a related delay switch which closes or opens in response to said thermal element being hot or cold respectively. Following an impressed current, the actuation of said relay is delayed by the time required for said thermal element to become hot; and conversely, following the cut-off of impressed current.

It will now be demonstrated that wiper drive 21 is inoperative during periods of electrolytic current passage but is actuated for brief intervals following each said period, the magnitude of the interval being governed by time delay relays 35 and 35'. In a preferred mode according to the invention, the brief interval of wiping occurs after reversing relay 12 operates.

Two alternate circuits are involved in providing power to terminals 22 and 23 of wiper drive 21, a circuit to the left in FIG. 1 including relay 39 and time delay relay 35, and a circuit to the right including relay 43 and time delay relay 35', each said circuit coacting with periodic timer 24.

During the period of cyclic passage of reversing electrolytic current in which timer switch 27 is closed, coil 38 of relay 39 and coil 42 of relay 43 are energized, while A.C. current from power supply 29 passes directly to thermal element 36 of time delay relay 35. As a result, delay switch 41 thereof is closed, but since relay switch 40 is open, the circuit on the left to wiper drive terminals 22 and 23 is open. Also, relay switch 47 is closed; since no current flows to thermal element 45 because of relay switch 44 being open, delay switch 46 does not close, and so the circuit on the right is also open to said terminals 22 and 23.

At the instant that timer switch 27 now opens, beginning another period of electrolytic current passage in reverse from that preceding, said coils 38 and 42 are now deenergized, and current is cut off from thermal element 36. The instantaneous closing of relay switch 40 closes a circuit through delay switch 41 to wiper drive terminals 22 and 23. The resultant interval of wiping is brief, however, because said delay switch 41 opens as soon as thermal element 36 will have cooled down. The circuit on the left to said terminals 22 and 23 is thereafter open throughout the remainder of the period. The circuit on the right is also open, in view of relay switch 47 being open. Meanwhile, delay switch 46 is closed in view of current passing to thermal element 45 through the closed relay switch 44.

At the instant that timer switch 27 now again closes, beginning still another period of electrolytic current passage in reverse from that preceding, said coils 38 and 42 are again energized and current passes directly to thermal element 36. The instantaneous closing of relay switch 47 closes a circuit on wiper drive terminals 22 and 23 through the said closed delay switch 46. The resultant interval of wiping is brief, however, because said delay switch 46 opens as soon as thermal element 45 will have cooled down because of the current cut-off to it caused by relay switch 44 having opened. During the remainder of the period of electrolytic current passage with timer switch 27 closed, both the left and right circuits to terminals 22 and 23 are open as hereinabove demonstrated.

A complete cycle has now been described of periods of reversing electrolytic current passage with brief intervals of wiping of electrodes 10 and 10' after each current reversal.

The invention further contemplates that when wiping ceases, reciprocating wipers 19 and 19' shall come to rest at the terminus of a wiping stroke, for example on foreign anode 18 as aforesaid. For this purpose, bar 52 is attached to wiper rod 20, and limit switch 53 is placed in circuit with coil 54 of relay 51, switch 50 of which is normally closed. At the lower terminus of a wiping stroke, bar 52 presses against limit switch 53 causing it to close, whereupon coil 54 of relay 51 is energized, and switch 50 correspondingly opens, breaking a circuit to wiper drive terminals 22 and 23. If at the same time both of the aforesaid left and right circuits through time delay relays 35 and 35' respectively are open, cut-off of current to terminals 22 and 23 is absolute, and wiper drive 21 is deactuated, precisely at the terminus of a wiper stroke.

In the method as thus far described, electrolytic current is passed throughout the wiping interval, so that wiping is applied as film is being formed on the electrodes. This is inconsistent with general practice of the invention; and while in the circumscribed interval, the concurrence of wiping and film forming may be of little or no detriment, nevertheless it may be desired to avoid any such concurrence. By discontinuing the electrolytic current during the wiping interval, film formation at this time is omitted, so that in the sum, wiping is applied only to an accumulated film formed during the non-wiping period of electrolytic operation.

In the instance of electrolytic current being discontinued during the wiping interval, electrodes 10 and 10' may float in open circuit, or alternately they may be conditioned. By conditioning is meant that said electrodes may be short-circuited, and thereby depolarized as taught in my U.S. Patent 2,860,090; or alternately, one or both of said electrodes may be made cathode to foreign anode 18, whereby an evolution of hydrogen takes place at said electrode or electrodes while being wiped.

When during the wiping interval the electrolytic current is to be discontinued, relays 61, 71 or 81 are alternately employed in the electrolytic circuit. These relays operate only during the wiping interval, inasmuch as their respective coils 60, 70 and 80 are in parallel circuit to wiper drive terminals 22 and 23.

Figure 2:
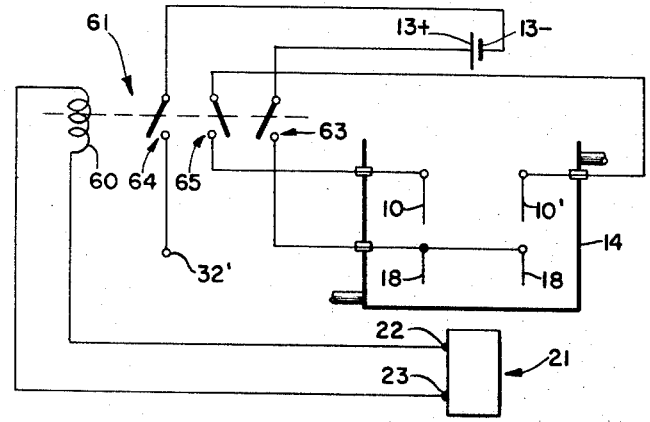
FIG. 2 is a schematic diagram of a modification in the apparatus of FIG. 1, illustrating an arrangement for wiping of the electrodes for brief interval during disconnection of the electrolytic current.

Descriptive of the instance of simple electrolytic current cut-off during the wiping interval, referring to FIG. 2, when relay 61 is actuated concurrently with actuation of wiper drive 21, relay switch 64 opens, and so the electrolytic current is disconnected as it passes to terminal 32' of reversing relay 12.

In the instance of simultaneous conditioning of electrodes 10 and 10' embodying short-circuiting thereof, switch 65 is included in relay 61. When said relay is actuated, as relay switch 64 opens, relay switch 65 also closes, completing a short circuit around the floating electrodes 10 and 10', and thus depolarizing them.

If foreign anode 18 has been in the electrolytic circuit, for example coupled alternately to electrodes 10 and 10' as cathode, switch 63 may be included in relay 61. Its opening, uponactuation of said relay, removes anodic power, originating in terminal 13+, from foreign anode 18 during the wiping interval.

Figure 3:
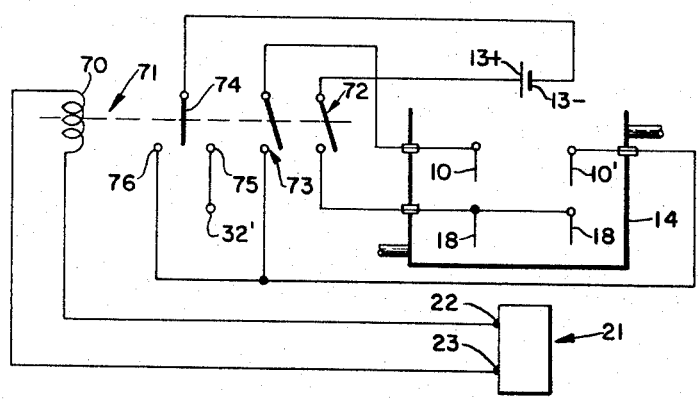
FIG. 3 is a schematic diagram of an alternate modification in the apparatus of FIG. 1, illustrating an arrangement for wiping of the electrodes for a brief interval during disconnection of the electrolytic current and coupling of a foreign anode to said electrodes.

In an alternate mode of electrode conditioning during the wiping interval, referring to FIG. 3, when relay 71 is actuated concurrently with actuation of wiper drive 21, armature 74 breaks from contact 75, cutting off electrolytic current passing to terminal 32'; while the closing of relay switch 73 places a short circuit on the floating electrodes 10 and 10'. Armature 74, subsequently making on contact 76, causes cathodic power from terminal 13− to be applied to said short circuited electrodes 10 and 10'. Also, the closing of relay switch 72 places anodic power from terminal 13+ on foreign anode 18. The resultant is that during the wiping interval a circuit is established between foreign anode 18 and the short-circuited electrodes 10 and 10' as cathode.

Figure 4:
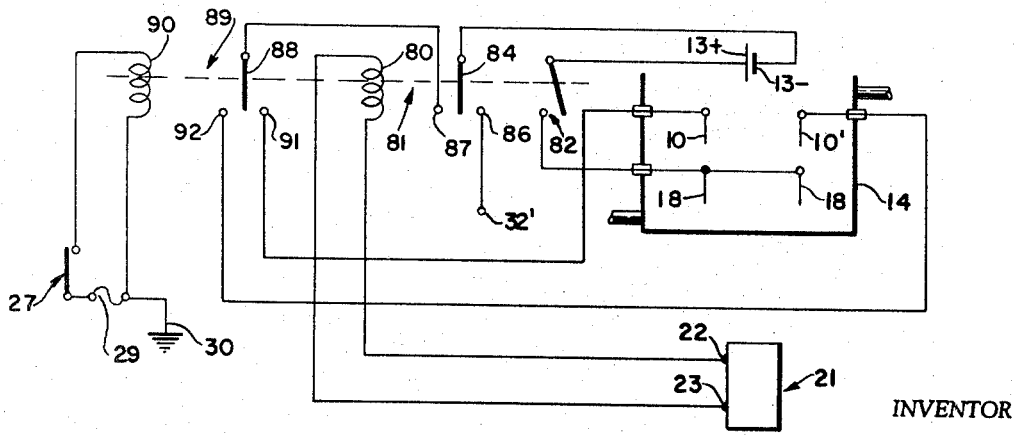
FIG. 4 is a schematic diagram illustrating a modification of the FIG. 3 arrangement for the connection of a foreign anode.

In a further alternate mode of electrode conditioning, referring to FIG. 4, when relay 81 is actuated concurrently with actuation of wiper drive 21, armature 84 breaks from contact 86, cutting off electrolytic current passing to terminal 32'; while the closing of relay switch 82 places anodic power from terminal 13+ on foreign anode 18. Said armature 84, subsequently making on contact 87, causes cathodic power to be applied from terminal 13— to armature 88 of relay 89. Coil 90 of said relay 89 is in circuit with timer switch 27. In view, as described hereinabove, of the keying of timer switch 27 to the polarity of electrode 10 or 10', armature 88, in making alternately on contact 91 or 92, transfers cathodic power from armature 84 selectively to that electrode 10 or 10' which had been anode in the previous half-cycle of reversing electrolytic current. In the resultant, therefore, during the wiping intervals, a circuit is established between foreign anode 18 and an electrode 10 or 10' selected as cathode after having been anode in the previous electrolytic circuit.

Heretofore, the film on the electrodes has been recognized as being either soft or indurated. There is evidence, however, of an intermediate state which may be called congealed. The characteristic of a congealed film is that its presence hinders electrolytic current passage, but it is removable by methods short of the extreme of scraping or abrading required for an indurated film. The transition, during residence of a film on the electrode, is then from soft to congealed to indurated.

The period of nonwiping electrolytic current passage is logically to be limited to that in which the accumulating film is neither congealed nor indurated, but remains soft. Since in this state it appears to offer no noticeable electric resistance, the limit can be expressed objectively in terms of electrolytic efficiency, and specifically shall be that within which there is no noticeable decrease in the electrolytic current.

As a matter of experience, the period of non-wiping electrolytic current passage will generally be in the range 10 minutes to 180 minutes, while the interval of wiping after each said period will be in the range 5 seconds to 120 seconds.

Discontinual wiping permits of an accumulation of a mass of soft film to which wiping is thereafter applied. Evidently, it is the condition of accumulation that is related to the improved electrolytic efficiency obtainable over that with continual wiping in which an accumulation is unable to occur.

In explanation of the effect, it is my concept that during continual wiping a residue or subfilm adheres to the electrode surface, where it congeals or indurates. When a mass of soft film is allowed to accumulate by avoidance of wiping, it exerts a pull on all matter within it down to the electrode surface itself. The phenomenon is familiarly that of coherence, or similar to it. When wiping is applied to the accumulated mass, this is entirely swept away, its coherence or attraction causing any subfilm or residue to be included that would otherwise remain on the electrode surface.

The coherence understandably will extend to all soft matter constituting the mass. However, there is evidence that it extends also to congealed film as defined.

A test of this was afforded by an experiment with aluminum electrodes, in which after 75 hours of electrolytic operation employing continual wiping the current at constant voltage had fallen from 3.4 amperes to 1.8 amperes. Thereupon, discontinual wiping was instituted, comprising 30 seconds of wiping during no electrolytic current flow after each 15 minute period of reversing current applied with no wiping. After one hour, the current had risen to 2.5 amperes. This increase represents an appreciable improvement in electrolytic efficiency, obtained as a result of the instituted discontinual wiping.

During one of the intervals of said discontinual wiping, pieces of gelatinous matter, apparently aluminum hydroxide, were seen to slough off the wiped electrodes into the flowing, clear water. These pieces evidently comprised residues of film that had congealed on the electrode surface, had piled up during the span of previous continual wiping, and caused the original decrease in electrolytic current and efficiency. The subsequent introduction of discontinual wiping resulted in a removal, during the brief wiping intervals, of the built-up congealed film, and a resultant improvement in electrolytic efficiency as noted.

The theory which has been set forth hereinabove is regarded as helpful in interpreting the effectiveness of discontinual wiping in electrolytic metal hydroxide production. However, the method as described is not dependent upon it in any way, but derives its validity only from the improved, useful results obtained.

Wiping has been selected herein as a preferred method of removal of the accumulated soft film. However, it is to be understood that other applicable means may be employed for this purpose, such as for example, that described in my U.S. Patent 2,919,235.

Having thus described my invention, it will be recognized that adaptations of the method and structure may be made which will fall within the terms and scope of the invention as claimed.

What I claim is:

1. In the electrolytic production from metal electrodes of metal hydroxide in a liquid in which it is insoluble, applying reversing electrolytic current to the electrodes in cycles of substantial periods of time, wiping the electrodes for a brief interval at or subsequent to each current reversal, and discontinuing wiping during the major remaining portion of each cycle.

2. In the electrolytic production from metal electrodes of metal hydroxide in a liquid in which it is insoluble, applying reversing electrolytic current to the electrodes for a time in the range of from 10 minutes to 180 minutes, wiping the electrodes for from 5 seconds to 120 seconds at or subsequent to each current reversal, and discontinuing wiping during the major remaining portion of each cycle.

3. In the electrolytic production from metal electrodes of metal hydroxide in a liquid in which it is insoluble, applying reversing electrolytic current to the electrodes in cycles of substantial periods of time, disconnecting the electrolytic current while reversing the current direction, wiping the electrodes for a brief interval at or subsequent to each current reversal, and discontinuing wiping during the major remaining portion of each cycle.

4. In the electrolytic production from metal electrodes of metal hydroxide in a liquid in which it is insoluble, applying reversing electrolytic current to the electrodes in cycles of substantial periods of time, disconnecting the electrolytic current and short-circuiting the electrodes while reversing the current direction, wiping the electrodes for a brief interval at or subsequent to each current reversal, and discontinuing wiping during the major remaining portion of each cycle.

5. In the electrolytic production of metal hydroxide in a liquid in which it is insoluble from metal electrodes in the presence of a foreign anode, applying reversing electrolytic current to the electrodes in cycles of substantial periods of time, disconnecting the electrolytic current and the foreign anode while reversing the current direction, wiping the electrodes for a brief interval at or subsequent to each current reversal and discontinuing wiping during the major remaining portion of each cycle, 6. In the electrolytic production of metal hydroxide in a liquid in which it is insoluble from metal electrodes in the presence of a foreign anode, applying reversing electrolytic current to the electrodes in cycles of substantial periods of time, disconnecting the electrolytic current and short-circuiting the electrodes and making the short-circuited electrodes cathode to the foreign anode while reversing the current direction, wiping the electrodes for a brief interval at or subsequent to each current reversal, and discontinuing wiping during the major remaining portion of each cycle.

7. In the electrolytic production of metal hydroxide in a liquid in which it is insoluble from metal electrodes in the presence of a foreign anode, applying reversing electrolytic current to the electrodes in cycles of substantial periods of time, disconnecting the electrolytic current while reversing the current direction and making those of the electrodes which had been anode before reversal now cathode to the foreign anode, wiping the electrodes for a brief interval at or subsequent to each current reversal, and discontinuing wiping during the major remaining portion of each cycle.

References Cited

UNITED STATES PATENTS

| 2,216,167 | 10/1940 | Fisher | 204—227 |
| 2,860,090 | 11/1958 | Roller | 204—96 |
| 3,006,826 | 10/1961 | Roller | 204—96 |

FOREIGN PATENTS 28,400  6/1904  Great Britain.

JOHN H. MACK, *Primary Examiner.*

D. R. JORDAN, *Assistant Examiner.*

U.S. Cl. X.R.

204—222, 58, 223